United States Patent
Tashiro

(10) Patent No.: US 8,775,028 B2
(45) Date of Patent: Jul. 8, 2014

(54) VEHICLE STEERING SYSTEM

(71) Applicant: JTEKT Corporation, Osaka (JP)

(72) Inventor: Takashi Tashiro, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/827,120

(22) Filed: Mar. 14, 2013

(65) Prior Publication Data

US 2013/0253772 A1    Sep. 26, 2013

(30) Foreign Application Priority Data

Mar. 22, 2012  (JP) ................... 2012-065677

(51) Int. Cl.
*B62D 5/00*    (2006.01)

(52) U.S. Cl.
CPC ...................... *B62D 5/003* (2013.01)
USPC ................. 701/43; 701/41; 701/36; 180/404; 180/405

(58) Field of Classification Search
CPC ....................................................... B62D 5/003
USPC .......................... 701/43, 41, 36; 180/404, 405
See application file for complete search history.

(56) References Cited

U.S. PATENT DOCUMENTS

| | | | | |
|---|---|---|---|---|
| 4,437,531 A | * | 3/1984 | Urabe ............................. | 180/446 |
| 5,457,632 A | * | 10/1995 | Tagawa et al. ................... | 701/43 |
| 5,803,202 A | * | 9/1998 | Bohner et al. .................. | 180/443 |
| 7,004,279 B2 | * | 2/2006 | Shitamitsu et al. ........... | 180/402 |
| 7,604,083 B2 | * | 10/2009 | Chino et al. ................... | 180/402 |
| 7,628,245 B2 | * | 12/2009 | Osonoi et al. ................. | 180/405 |
| 7,664,584 B2 | * | 2/2010 | Chino et al. .................... | 701/41 |
| 7,789,784 B2 | * | 9/2010 | Hayashi et al. ................. | 475/18 |
| 8,066,092 B2 | * | 11/2011 | Shimizu et al. ............... | 180/444 |
| 8,087,488 B2 | * | 1/2012 | Onuma et al. ................. | 180/404 |
| 8,657,062 B2 | * | 2/2014 | Tashiro .......................... | 180/446 |
| 2004/0230361 A1 | * | 11/2004 | Oshima et al. .................. | 701/69 |
| 2006/0200289 A1 | * | 9/2006 | Chino et al. .................... | 701/41 |
| 2013/0138300 A1 | * | 5/2013 | Hayama ......................... | 701/43 |
| 2013/0144493 A1 | * | 6/2013 | Hayama ......................... | 701/43 |
| 2013/0161116 A1 | * | 6/2013 | Tashiro .......................... | 180/446 |
| 2013/0253771 A1 | * | 9/2013 | Hayama ......................... | 701/43 |
| 2013/0253772 A1 | * | 9/2013 | Tashiro .......................... | 701/43 |

FOREIGN PATENT DOCUMENTS

JP   A-10-278826   10/1998
JP   A-2004-90784   3/2004

* cited by examiner

*Primary Examiner* — Thomas Black
*Assistant Examiner* — Wae Louie
(74) *Attorney, Agent, or Firm* — Oliff PLC

(57) ABSTRACT

In normal times, a rotation angle restriction mechanism in a first state restricts a rotation angle of a steering member within a first rotation angular range. In the event of a failure, that is, when there is a malfunction in a steering angle sensor, the rotation angle restriction mechanism is switched into a second state by an electromagnetic clutch, and the rotation angle of the steering member is restricted within a second rotation angular range. A steering direction is detected on the basis of at which one of a pair of terminal ends of the second rotation angular range, the steering member is located. An ECU executes drive control on a steering system actuator on the basis of the detected steering direction.

4 Claims, 8 Drawing Sheets

VEHICLE STEERING SYSTEM

INCORPORATION BY REFERENCE/RELATED APPLICATION

This application claims priority to Japanese Patent Application No. 2012-065677 filed on Mar. 22, 2012 the disclosure of which, including the specification, drawings and abstract, is incorporated herein by reference in its entirety.

BACKGROUND OF THE INVENTION

1. Field of the Invention

The invention relates to a vehicle steering system.

2. Discussion of Background

Japanese Patent Application Publication No. 10-278826 (JP 10-278826 A) describes a so-called steer-by-wire steering system in which a steering member and steered wheels are not mechanically coupled to each other. JP 10-278826 A suggests that there are provided a main steering angle sensor and a backup steering angle sensor that is used in place of the main steering angle sensor in the event of a failure of the main steering angle sensor. In addition, Japanese Patent Application Publication No. 2004-90784 (JP 2004-90784 A) describes a steer-by-wire steering system in which a planetary gear mechanism is arranged between a steering member and a steered mechanism. JP 2004-90784 A suggests that, in the event of a failure of a steering angle sensor, rotation of a ring gear of the planetary gear mechanism is restrained to allow manual steering via the planetary gear mechanism of which the gear ratio has been fixed through the restraint of the rotation of the ring gear.

According to JP 10-278826 A, the multiple expensive steering angle sensors are used, which increases the manufacturing cost. According to JP 2004-90784 A, the planetary gear mechanism is used, which also increases the manufacturing cost.

SUMMARY OF THE INVENTION

The invention provides a vehicle steering system that enables steering in the event of a failure, that is, when a malfunction occurs in a steering angle sensor, by detecting a steering direction and then executing drive control on a steering system actuator on the basis of the detected steering direction.

According to a feature of an example of the invention, in normal times, a rotation angle restriction mechanism in a first state restricts a rotation angle of a steering member within a first rotation angular range; whereas, in the event of a failure, that is, there is a malfunction in a steering angle sensor, the rotation angle restriction mechanism is switched into a second state by an electromagnetic clutch, and the rotation angle of the steering member is restricted within a second rotation angular range, a steering direction is detected on the basis of at which one of a pair of terminal ends of the second rotation angular range, the steering member is located, and an ECU executes drive control on a steering system actuator on the basis of the detected steering direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
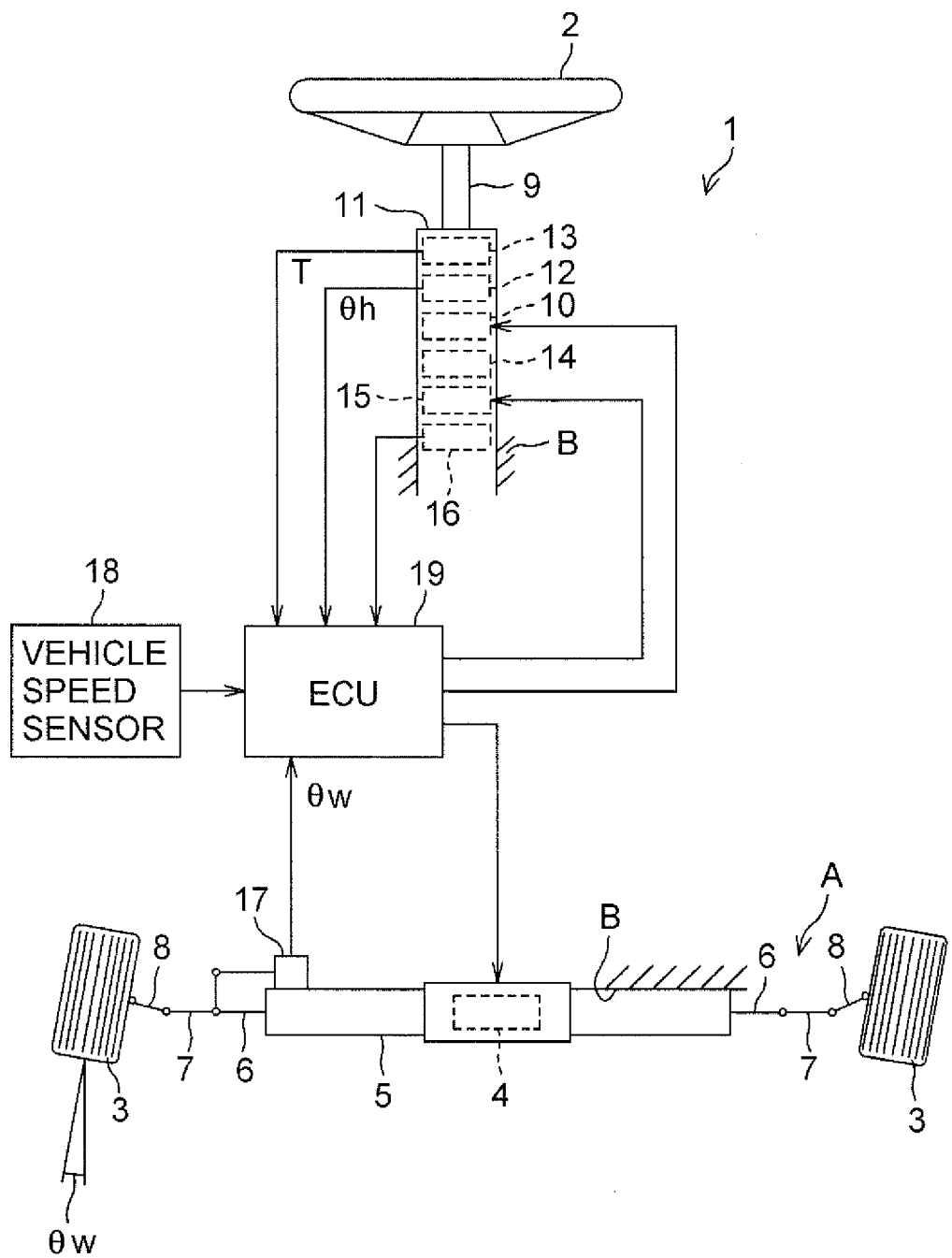
FIG. 1 is a schematic view that shows the schematic configuration of a vehicle steering system according to an embodiment of the invention.

FIG. 1 is a schematic view that shows the schematic configuration of a vehicle steering system 1 according to an embodiment of the invention. The vehicle steering system 1 constitutes a so-called steer-by-wire system in which a steering member 2, such as a steering wheel, is not mechanically coupled to steered wheels 3.

In the vehicle steering system 1, an operation of a steering system actuator 4 that is driven in response to a rotating operation of the steering member 2 is converted into a linear motion of a steered shaft 6 in the vehicle-width direction. The steered shaft 6 is supported by a housing 5. The linear motion of the steered shaft 6 is converted into steered motions of the right and left steered wheels 3. Thus, a vehicle is steered. The position of the steering member 2, which corresponds to the position of the steered wheels 3 at the time when the vehicle is travelling straight ahead, is set as a neutral position.

The steering system actuator 4 includes, for example, an electric motor. The driving force of the electric motor (the rotational force of an output shaft) is converted into an axial linear motion of the steered shaft 6 by a ball screw mechanism provided for the steered shaft 6. The linear motion of the steered shaft 6 is transmitted to tie rods 7 coupled to respective ends of the steered shaft 6, and causes the pivot motions of knuckle arms 8. Thus, the steered wheels 3 supported by the knuckle arms 8 are steered.

The steered shaft 6, the tie rods 7 and the knuckle arms 8 constitute a steered mechanism A used to steer the steered wheels 3. The housing 5 that supports the steered shaft 6 is fixed to a vehicle body B. The steering member 2 is coupled to a steering shaft 9 that is rotatably supported by the vehicle body B. A reaction motor 10 is fitted to the steering shaft 9. The reaction motor 10 is used to apply reaction force, which is transmitted from a road surface, or the like, to the steered wheels 3, to the steering member 2 as steering reaction force. The reaction motor 10 includes an electric motor, such as a brushless motor. The reaction motor 10 is accommodated in a housing 11 that is fixed to the vehicle body B.

The vehicle steering system 1 includes a steering angle sensor 12 provided on the steering shaft 9. The steering angle sensor 12 is used to detect a steering angle θh of the steering member 2. A torque sensor 13 is provided on the steering shaft 9. The torque sensor 13 is used to detect a steering torque T applied to the steering member 2. The steering angle sensor 12 and the torque sensor 13 are accommodated in the housing 11. In addition, a rotation angle restriction mechanism 14, an electromagnetic clutch 15 and steering direction detection sensors 16 are accommodated in the housing 11. The rotation angle restriction mechanism 14 restricts the rotation angle of the steering member 2. The electromagnetic clutch 15 serves as a switching mechanism. The steering direction detection sensors 16 serve as a steering direction detection unit.

The rotation angle restriction mechanism 14 has the function of restricting the rotation angle of an output shaft 24 of the steering shaft 9 within a predetermined angle. The steering shaft 9 serves as a rotary shaft of the steering member 2 that may be rotated 360° or more to steer the vehicle. In the steer-by-wire vehicle steering system 1 in the present embodiment, the steering member 2 is not subjected to restrictions from the steered mechanism A. Therefore, in order to prevent the steering member 2 from being operated beyond an operation limit of the steered mechanism A, the rotation angle restriction mechanism 14 restricts the rotation angle of the steering member 2 within the predetermined angle corresponding to the operation limit.

Specifically, the rotation angle restriction mechanism 14 may be switched between a first state and a second state. In the first state, the rotation angle of the steering member 2 is restricted within a first rotation angular range larger than or equal to 360° (δmax described later: for example, 1620°). In the second state, the rotation angle of the steering member 2 is restricted within a second rotation angular range smaller than 360° (δ2 described later: for example, a predetermined value that falls within the range of 30° to 120°: for example, 90°. The rotation angle restriction mechanism 14 is switched between the first state and the second state by the electromagnetic clutch 15 that serves as the switching mechanism. The steering direction detection sensors 16 detect the steering direction of the steering member 2 when the rotation angle restriction mechanism 14 is in the second state.

In addition, the vehicle steering system 1 includes a steered angle sensor 17 at the steered shaft 6. The steered angle sensor 17 is used to detect a steered angle θw (tire angle) of the steered wheels 3. In addition to these sensors, a vehicle speed sensor 18 that detects a vehicle speed V is provided. Detection signals from these sensors 12, 13, 16 to 18 are input into an electronic control unit (ECU) 19 that serves as a control unit that includes a microcomputer.

The ECU 19 sets a target steered angle on the basis of the steering angle θh detected by the steering angle sensor 12 and the vehicle speed V detected by the vehicle speed sensor 18. The ECU 19 executes drive control (steered operation control) on the steering system actuator 4 via a drive circuit (not shown) incorporated in the ECU 19, on the basis of a deviation between the target steered angle and the steered angle δw detected by the steered angle sensor 17.

In addition, the ECU 19 executes drive control (reaction control) on the reaction motor 10 via the drive circuit (not shown) incorporated in the ECU 19 such that an appropriate reaction force in a direction opposite to the direction in which the steering member 2 is steered is applied to the steering member 2, on the basis of the detection signals output from the sensors 12 to 17.

Figure 2:
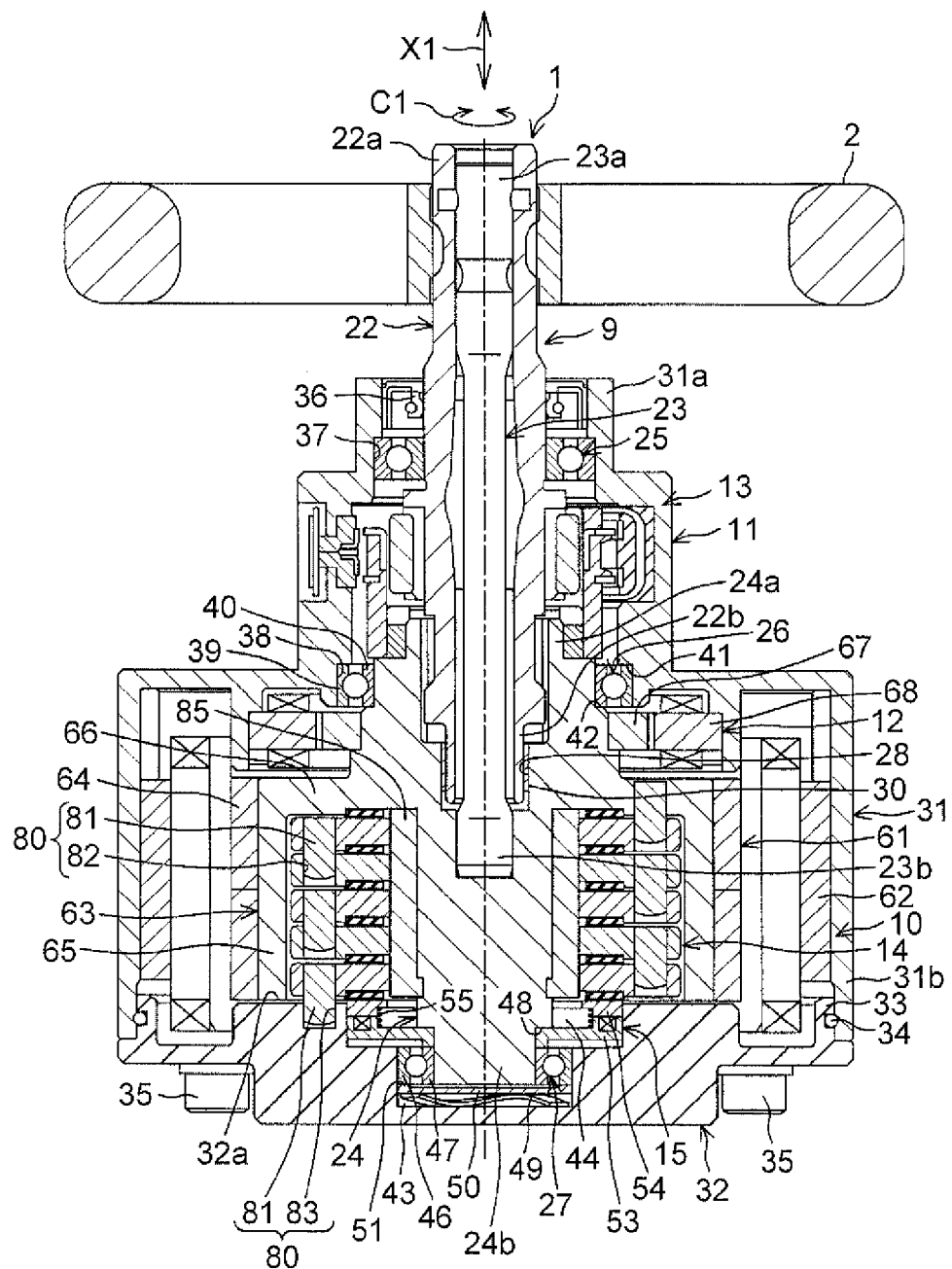
FIG. 2 is a sectional view of a housing that accommodates a reaction motor, a rotation angle restriction mechanism that restricts the rotation angle of a steering member, and the like, and shows a normal state.

As shown in FIG. 2, the steering shaft 9 is rotatably supported by the tubular housing 11. One end of the steering shaft 9 protrudes from the housing 11, and the steering member 2 is coupled to the one end so as to be rotatable together with the steering shaft 9.

The steering shaft 9 includes an input shaft 22 and the output shaft 24. The steering member 2 is coupled to one end 22a of the input shaft 22 (which corresponds to the above-described one end of the steering shaft 9) so as to be rotatable together with the input shaft 22. The output shaft 24 is coaxially coupled to the input shaft 22 via a torsion bar 23 such that torque is transmittable between the input shaft 22 and the output shaft 24. The output shaft 24 corresponds to the rotary shaft of the steering member 2. One end 23a of the torsion bar 23 is coupled to the input shaft 22 so as to be rotatable together with the input shaft 22. The other end 23b of the torsion bar 23 is coupled to the output shaft 24 so as to be rotatable together with the output shaft 24.

The steering shaft 9 is rotatably supported by a first bearing 25, a second bearing 26 and a third bearing 27 that are retained by the housing 11. The first bearing 25 supports an axially intermediate portion of the input shaft 22 such that the input shaft 22 is rotatable. The second bearing 26 and the third bearing 27 support the output shaft 24 such that the output shaft 24 is rotatable. Specifically, the second bearing 26 supports a portion of the output shaft 24, which is near one end 24a of the output shaft 24, such that the output shaft 24 is rotatable, and the third bearing 27 supports the other end 24b of the output shaft 24 such that the output shaft 24 is rotatable.

The other end 22b of the input shaft 22 is inserted into a support hole 28 formed in the output shaft 24. The other end 22b of the input shaft 22 is rotatably supported by the inner periphery of the output shaft 24, which defines the support hole 28, via a fourth bearing 30. The housing 11 is formed by assembling a housing body 31 and an end wall 32 together. The housing body 31 has a tubular shape, and has one end 31a and the other end 31b. The end wall 32 that is part of the housing 11 has a generally plate shape, and closes the other end 31b of the housing body 31.

Specifically, the end wall 32 has a tubular portion 33 that protrudes in the axial direction from a portion of the end wall 32, which is near the radially outer portion of the end wall 32, and the tubular portion 33 is fitted to the inner periphery of the other end 31b of the housing body 31. An O-ring 34 is accommodated in an accommodation groove formed in the outer periphery of the tubular portion 33. A joint between the housing body 31 and the tubular portion 33 is hermetically sealed by the O-ring 34. The end wall 32 is fixed to the other end 31b of the housing body 31 with, for example, fixing screws 35. The end wall 32, which is part of the housing 11, constitutes a non-rotatable element (described later) of the rotation angle restriction mechanism 14.

An oil seal 36 is interposed between the inner periphery of the one end 31a of the housing body 31 and the outer periphery of the input shaft 22 of the steering shaft 9. The first bearing 25 is retained by a bearing retaining portion 37 formed in the inner periphery of the one end 31a of the housing body 31. The second bearing 26 is retained by a bearing retaining portion 38 formed in an axially intermediate portion of the housing body 31, and supports the outer periphery of a portion of the output shaft 24, which is near the one end 24a of the output shaft 24, such that the output shaft 24 is rotatable. The second bearing 26 includes an outer ring 39 and an inner ring 40. The outer ring 39 is fixedly fitted to the bearing retaining portion 38. The inner ring 40 is fitted to the outer periphery of the output shaft 24 so as to be rotatable together with the output shaft 24.

One end face of the outer ring 39 of the second bearing 26 contacts a positioning step 41 formed at one end of the bearing retaining portion 38 of the housing body 31. This restricts movement of the outer ring 39 toward one side (toward the first bearing 25) in an axial direction X1 of the output shaft 24. One end face of the inner ring 40 of the second bearing 26 contacts a positioning step 42 formed in the outer periphery of the output shaft 24. This restricts movement of the inner ring 40 toward the other side (toward the third bearing 27) in the axial direction X1 of the output shaft 24.

A circular center recess 43 and an annular recess 44 are formed in an inner wall face 32a of the end wall 32. The center recess 43 serves as a first recess. The annular recess 44 surrounds the center recess 43 and serves as a second recess. The depth of the center recess 43 is larger than the depth of the annular recess 44. The other end 24b of the output shaft 24 is inserted into the center recess 43. The third bearing 27 is retained by the inner periphery of the end wall 32, which defines the center recess 43, and supports the other end 24b of the output shaft 24 such that the output shaft 24 is rotatable.

The third bearing 27 includes an outer ring 46 and an inner ring 47. The outer ring 46 is loosely fitted to the inner periphery of the end wall 32, which defines the center recess 43, so as to be non-rotatable and axially movable. The inner ring 47 is fitted to the outer periphery of the other end 24b of the output shaft 24 so as to be rotatable together with the output shaft 24. The inner end of a clutch rotor 53 (described later) of the electromagnetic clutch 15 (switching mechanism) is held between one end face of the inner ring 47 of the third bearing 27 and a positioning step 48 formed in the outer periphery of the output shaft 24. This restricts movement of the inner ring 47 toward the one side (toward the second bearing 26) in the axial direction X1 of the output shaft 24.

An elastic member 49 and a spacer 50 are accommodated in the center recess 43. The elastic member 49 is formed of, for example, a wave washer, and collectively applies an axial preload to the second bearing 26 and the third bearing 27. The spacer 50 serves as a preload application member, and is interposed between the elastic member 49 and the third bearing 27. The spacer 50 is formed of a circular plate or an annular plate. The spacer 50 has an annular protrusion 51 such that the spacer 50 contacts neither the end face of the other end 24b of the output shaft 24 nor the end face of the inner ring 47 of the third bearing 27 and contacts only the end face of the outer ring 46. The elastic member 49 urges the outer ring 46 of the third bearing 27 via the annular protrusion 51 of the spacer 50 toward the one side in the axial direction X1 of the output shaft 24.

The urging force is received by the positioning step 41 of the housing body 31 via the outer ring 46 of the third bearing 27, the inner ring 47 of the third bearing 27, the positioning step 48 of the output shaft 24, the positioning step 42 of the output shaft 24, the inner ring 40 of the second bearing 26 and the outer ring 39 of the second bearing 26. Thus, it is possible to collectively apply an axial preload to the second bearing 26 and the third bearing 27.

The torque sensor 13 is arranged between the first bearing 25 and the second bearing 26 in the housing 11. The torque sensor 13 may be, for example, a torque sensor that uses a Hall IC (magnetic sensor). The ECU 19 is configured to calculate a steering torque input into the steering shaft 9 on the basis of a signal from the torque sensor 13.

The reaction motor 10 includes a motor rotor 61 and a motor stator 62. The motor rotor 61 is coupled to the output shaft 24 so as to be rotatable together with the output shaft 24. The motor stator 62 concentrically surrounds the motor rotor 61, and is fixed to the inner periphery of the housing body 31. The motor rotor 61 includes a rotor core 63 and a permanent magnet 64. The rotor core 63 is rotatable together with the output shaft 24. The permanent magnet 64 is coupled to the rotor core 63 so as to be rotatable together with the rotor core 63.

The rotor core 63 has a tubular first portion 65 and a second portion 66. The first portion 65 concentrically surrounds the output shaft 24. The second portion 66 couples one end 65a of the first portion 65 to the output shaft 24 such that the first portion 65 and the output shaft 24 are rotatable together with each other. The permanent magnet 64 is coupled to the outer periphery of the first portion 65 so as to be rotatable together with the first portion 65. The second portion 66 constitutes a rotatable element (described later) of the rotation angle restriction mechanism 14.

In the present embodiment, description is made on an example in which the rotor core 63 that has the first portion 65 and the second portion 66 is formed integrally with the output shaft 24 from a single material. Alternatively, a rotor core formed separately from the output shaft 24 may be fixedly coupled to the output shaft 24.

In the housing 11, the steering angle sensor 12 is arranged between the second portion 66 and the second bearing 26. The steering angle sensor 12 is formed of, for example, a resolver. The steering angle sensor 12 includes a resolver rotor 67 and a resolver stator 68. The resolver rotor 67 is coupled to the output shaft 24 so as to be rotatable together with the output shaft 24. The resolver stator 68 is fixed to the inner periphery of the housing body 31, and surrounds the resolver rotor 67.

Figure 3:
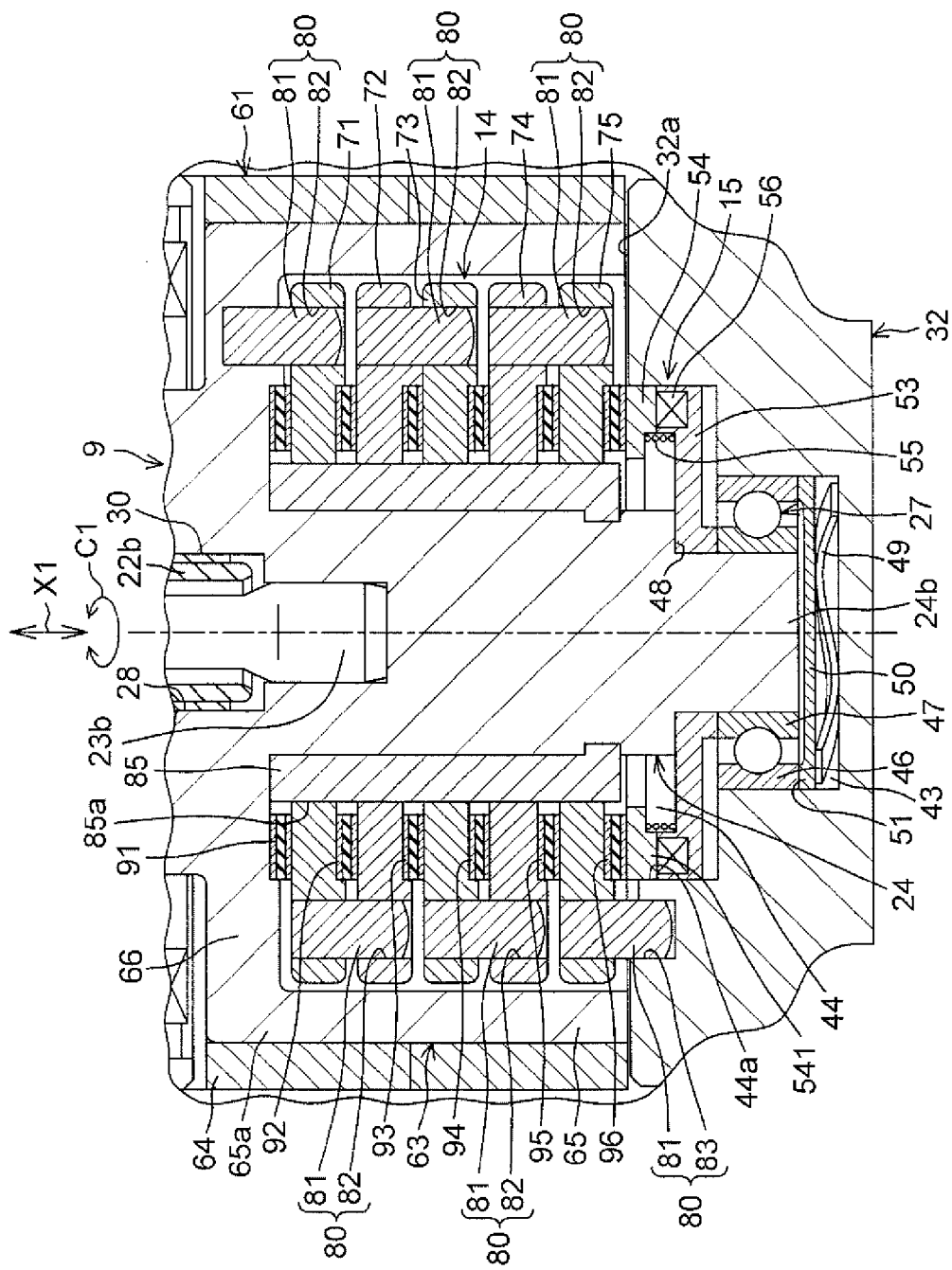
FIG. 3 is a partially enlarged sectional view of the rotation angle restriction mechanism and its surroundings in FIG. 2.
Figure 4:
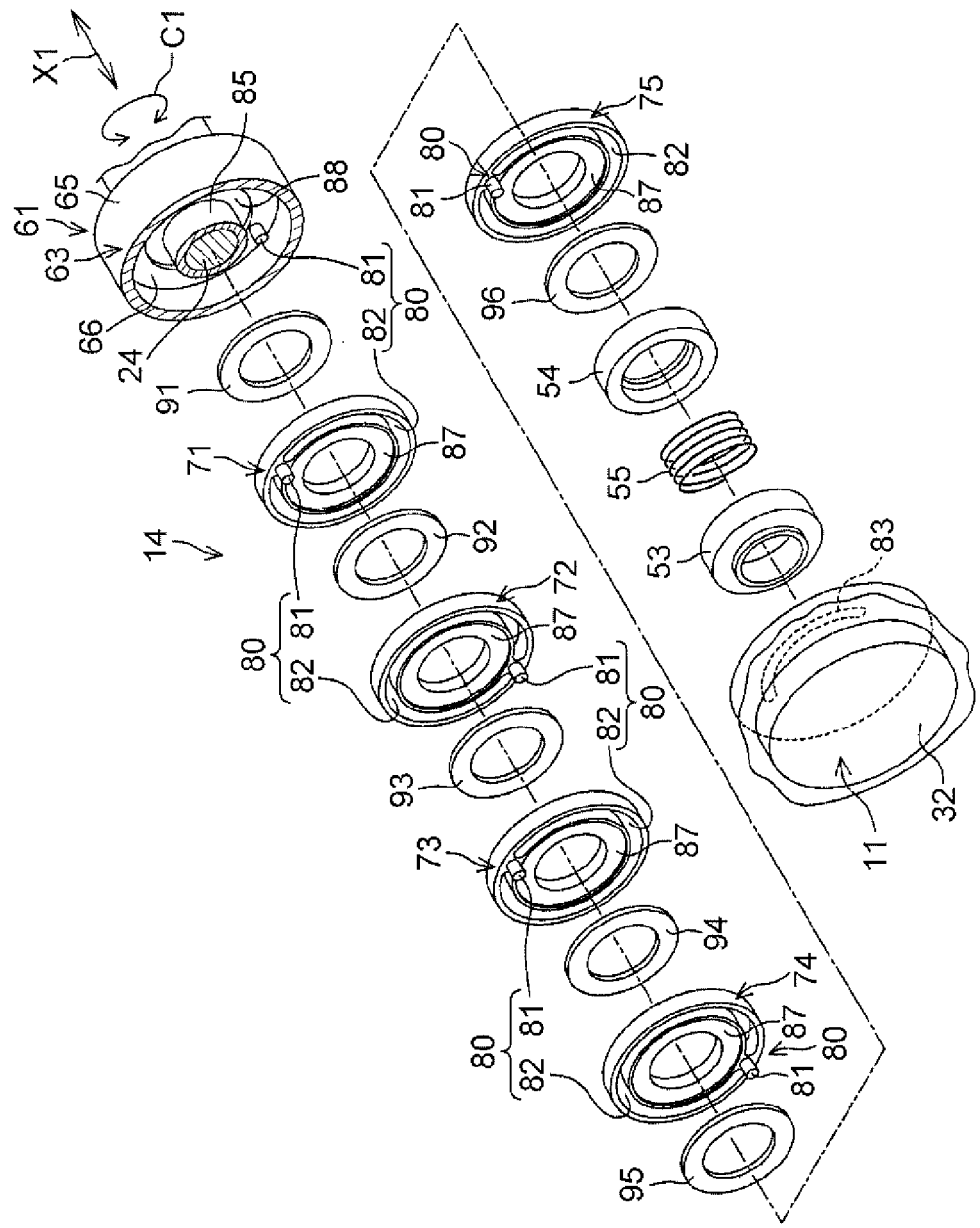
FIG. 4 is an exploded perspective view of the rotation angle restriction mechanism.

FIG. 3 is a partially enlarged sectional view of the rotation angle restriction mechanism 14 and its surroundings in FIG. 2. As shown in FIG. 3, almost all the elements of the rotation angle restriction mechanism 14 are arranged in a space on the radially inner side of the first portion 65 of the rotor core 63 of the motor rotor 61. As shown in FIG. 3 and FIG. 4 that is an exploded perspective view, the rotation angle restriction mechanism 14 includes the end wall 32 of the housing 11, a plurality of plate elements 71 to 75 and the second portion 66 of the rotor core 63. The end wall 32 of the housing 11 serves as the non-rotatable element. The plate elements 71 to 75 are coaxially supported by the output shaft 24 of the steering shaft 9 that serves as the rotary shaft of the steering member 2. The plate elements 71 to 75 are rotatable with respect to the output shaft 24 and are movable in the axial direction X1. The second portion 66 of the rotor core 63 serves as the rotatable element. The end wall 32 that serves as the non-rotatable element and the second portion 66 that serves as the rotatable element are arranged on respective sides of the plate elements 71 to 75 in the axial direction X1.

The rotation angle restriction mechanism 14 includes a plurality of coupling elements 80 that couple adjacent elements, among the non-rotatable element (end wall 32), the plate elements 71 to 75 and the rotatable element (second portion 66), so as to restrict an amount of relative rotation between the adjacent elements. The rotation angle restriction mechanism 14 includes a plurality of friction plates 91 to 96. The friction plates 91 to 96 each apply friction resistance to relative rotation between the adjacent elements.

The electromagnetic clutch 15 that serves as the switching mechanism switches the rotation angle restriction mechanism 14 between the first state (state where the rotation angle restricted by the rotation angle restriction mechanism 14 falls within the first rotation angular range δmax) and the second state (state where the rotation angle restricted by the rotation angle restriction mechanism 14 falls within the second rotation angular range 82).

The electromagnetic clutch 15 includes an annular clutch rotor 53, an annular pressing member 54, an urging member 55 formed of a compression coil spring or belleville spring, and an electromagnet 56. The clutch rotor 53 is supported so as to be rotatable together with the output shaft 24 and immovable in the axial direction X1. Specifically, the clutch rotor 53 is fitted to the outer periphery of the other end 24b of the output shaft 24. The radial inner end of the clutch rotor 53 is held between the positioning step 48 of the output shaft 24 and the inner ring 47 of the third bearing 27.

The pressing member 54 is supported so as to be movable in the axial direction X1 of the output shaft 24. The pressing member 54 presses the plate element 75 adjacent to the end wall 32 (non-rotatable element) toward the second portion 66 (rotatable element) of the rotor core 63. The urging member 55 is interposed between the clutch rotor 53 and the pressing member 54, and urges the pressing member 54 toward the second portion 66 (rotatable element) of the rotor core 63. The electromagnet 56 attracts the pressing member 54 and the clutch rotor 53 against the urging member 55. Although not shown in the drawing, the electromagnet 56 is formed by winding a coil around an iron core.

As shown in FIG. 3 and FIG. 4, each of the coupling elements 80 is formed of a pin-shaped protrusion 81 and a closed-end engagement groove 82 or 83. The protrusion 81 is provided at one of the corresponding adjacent elements, and protrudes in the axial direction X1. The engagement groove 82 or 83 is formed in the other one of corresponding adjacent elements such that the protrusion 81 engages with the engagement groove 82 or 83, and extends in the circumferential direction C1.

Figure 6A:
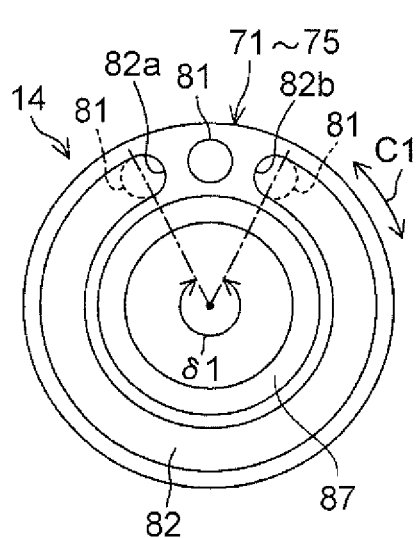
FIG. 6A is a schematic view that illustrates a movement range of a protrusion that engages with an engagement groove of a corresponding one of the plate elements.
Figure 6B:
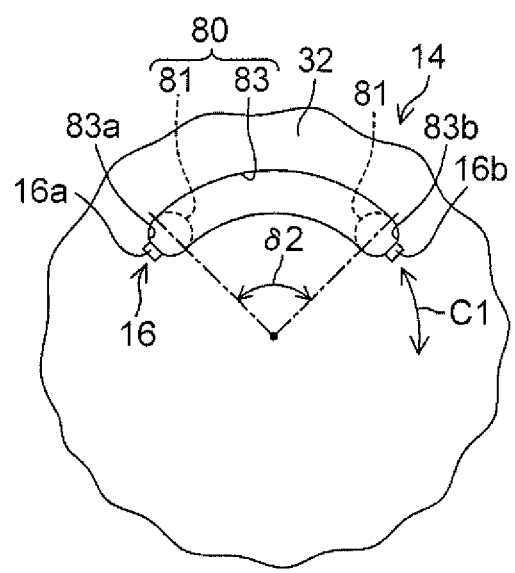
FIG. 6B is a schematic view that illustrates a movement range of a protrusion that engages with an engagement groove of an end wall that serves as a non-rotatable element.

As shown in FIG. 6A and FIG. 6B, each of the protrusions 81 engages with one of restricting portions 82a, 82b that are respective ends of a corresponding one of the engagement grooves 82 or one of restricting portions 83a, 83b that are respective ends of the engagement groove 83. Thus, an amount of relative rotation between adjacent elements is restricted.

As shown in FIG. 3 and FIG. 4, each of the plate elements 71 to 75 is formed of an annular plate, and is arranged between the first portion 65 and the output shaft 24. The plate elements 71 to 75 are supported on an outer periphery 85a of a tubular member 85 (for example, a plain bearing, such as a metal bush) so as to be rotatable and axially movable. The tubular member 85 is fitted to the outer periphery of the output shaft 24 so as to be rotatable together with the output shaft 24. The plate elements 71 to 75 are rotatable with respect to the output shaft 24 and the first portion 65.

The protrusion 81 is formed on one end face of each of the plate elements 71 to 75 so as to protrude therefrom, and the engagement groove 82 is formed so as to extend in the circumferential direction C1 in a region in which the protrusion 81 is not formed. The end wall 32 (non-rotatable element) of the housing 11 has the closed-end engagement groove 83 that extends in the circumferential direction C1.

Figure 5:
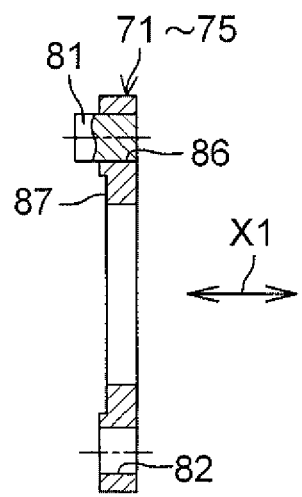
FIG. 5 is a sectional view of each of plate elements of the rotation angle restriction mechanism.

As shown in FIG. 5, each of the protrusions 81 is formed separately from a corresponding one of the plate elements 71 to 75, and part of each of the protrusions 81 is inserted and fixedly fitted in a fixing hole 86 of a corresponding one of the plate elements 71 to 75. Each protrusion 81 may be formed integrally with the corresponding one of the plate elements 71 to 75 from a single material. An annular receiving recess 87 is formed in at least one end face (end face from which each of the protrusions 81 protrudes in the present embodiment) of each of the plate elements 71 to 75.

As shown in FIG. 4, each receiving recess 87 contacts a corresponding one of the friction plates 92 to 96. In addition, the outer periphery of each of the friction plates 92 to 96 is rotatably supported by the peripheral wall face of the corresponding one of the receiving recesses 87. In addition, an annular receiving recess 88 is formed in the second portion 66 of the rotor core 63 of the rotor 61. The outer periphery of the friction plate 91 is rotatably supported by the peripheral wall face of the receiving recess 88.

As shown in FIG. 3 and FIG. 4, the protrusion 81 formed at the second portion 66 (rotatable element) is fitted in the closed-end engagement groove 82 formed in the plate element 71 so as to be slidable in the circumferential direction C1. In addition, the protrusions 81 respectively formed on the plate elements 71 to 74 are respectively slidably fitted in the corresponding engagement grooves 82 respectively formed in the adjacent plate elements 72 to 75. The protrusion 81 formed on the plate element 75 is slidably fitted in the engagement groove 83 formed in the end wall 32 (non-rotatable element) of the housing 11.

As shown in FIG. 6A, the range in which the engagement groove 82 is arranged in the circumferential direction C1 is set as follows: the movement range of each protrusion 81 that engages with the engagement groove 82 of a corresponding one of the plate elements 71 to 75 (range in which the protrusion 81 moves between the restricting portions 82a, 82b at respective ends of the engagement groove 82) is formed such that the relative rotation angle between the adjacent elements becomes δ1. As shown in FIG. 6B, the range in which the engagement groove 83 is arranged in the circumferential direction C1 is set as follows: the movement range of the protrusion 81, which engages with the engagement groove 83 of the end wall 32 (non-rotatable element) (range in which the protrusion 81 moves between the restricting portions 83a, 83b at respective ends of the engagement groove 83) is formed such that the relative rotation angle between the adjacent elements becomes δ2 (corresponding to the second rotation angular range).

In this case, the first rotation angular range δmax that is the rotation angular range of the steering member 2 (steering shaft 9) in normal times is expressed by the following equation.

$$\delta max = \delta 1 \times 5 + \delta 2$$

For example, when δ1 is 306° and δ2 is 90°, the rotation angle of the steering member 2 in normal times is restricted within the first rotation angular range (δmax=1620°); whereas the rotation angle of the steering member 2 at the time of a failure is restricted within the second rotation angular range (δ2=90°).

The plate elements 71 to 75 are the common ones, and arrangement of the engagement groove 83 of the end wall 32 is made different from arrangement of each of the engagement grooves 82 of the plate elements 71 to 75. Thus, it is possible to easily set the restriction range of the rotation amount of the steering member 2 (steering shaft 9) while achieving cost reduction. Note that, δ1 may be equal to δ2.

As shown in FIG. 3 and FIG. 4, each of the friction plates 91 to 96 is interposed between corresponding two adjacent elements such that friction resistance against relative rotation between the corresponding two adjacent elements is applied to the corresponding two adjacent elements.

For example, the friction plate 91 is interposed between the second portion 66 (rotatable element) and the plate element 71, and applies friction resistance against the relative rotation. The friction plates 92 to 95 are respectively interposed between the adjacent plate elements 71 and 72, between the adjacent plate elements 72 and 73, between the adjacent plate elements 73 and 74 and between the adjacent plate elements 74 and 75, and apply friction resistance against relative rotation between the corresponding adjacent two of the plate elements 71 to 75 to the corresponding adjacent two of the plate elements 71 to 75. The friction plate 96 is interposed between the plate element 75 and the pressing member 54 of the electromagnetic clutch 15, and applies friction resistance against relative rotation between the plate element 75 and the pressing member 54 to the plate element 75 and the pressing member 54.

As shown in FIG. 3, the urging member 55 and pressing member 54 of the electromagnetic clutch 15 are accommodated in the annular recess 44 of the inner wall face 32a of the end wall 32 of the housing 11, and are retained. The urging member 55 and the pressing member 54 each have an annular shape, and surround the output shaft 24. A compression coil spring shown in the drawing is, for example, used as the urging member 55. The urging member 55 is interposed between the clutch rotor 53 and the pressing member 54.

The outer periphery of the pressing member 54 is supported by a peripheral wall face 44a of the annular recess 44 so as to be movable in the axial direction X1. The pressing member 54 has, for example, an annular protruding portion 541 that serves as an axial movement restricting element and that protrudes in the axial direction. The annular protruding portion 541 is formed integrally with the pressing member 54 from a single material. The protruding portion 541 faces the electromagnet 56 in the axial direction X1. The annular protruding portion 541 surrounds part of the urging member 55.

The urging member 55 elastically urges the pressing member 54 toward the friction plate 96. Thus, the urging member 55 elastically holds a laminated unit between the pressing member 54 and the second portion 66 (rotatable element) of the motor rotor 61. The laminated unit includes the plate elements 71 to 75 and the friction plates 91 to 96. The friction plates 91 to 96 serve as the friction resistance application elements. That is, the urging member 55 collectively applies axial urging force to the plate elements 71 to 75 and friction plates 91 to 96 of the laminated unit. The magnitude of the urging force is set to such a magnitude that the friction plates 91 to 96 are able to rotate members, which contact with the friction plates 91 to 96, together with each other.

Figure 7:
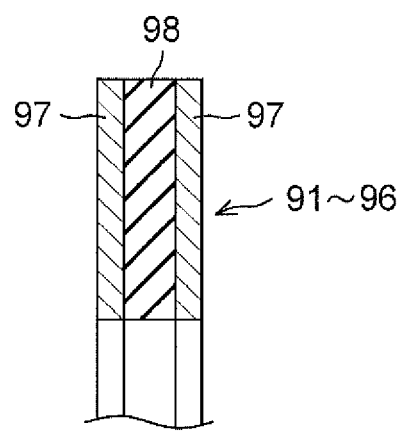
FIG. 7 is an enlarged sectional view of each friction plate.

As shown in FIG. 7, each of the friction plates 91 to 96 has a laminated structure that includes a pair of metal plates 97 and an elastic plate 98 made of, for example, a rubber plate held between the metal plates 97. In normal times as shown in FIG. 3, because the electromagnetic clutch 15 is on (excited), the pressing member 54 is attracted to the electromagnet 56. Therefore, the urging force of the urging member 55 is not loaded on the friction plates 91 to 96, and the elastic plate 98 of each of the friction plates 91 to 96 is compressed by a small amount. Thus, the elastic repulsive force (urging force) of the elastic plate 98 of each of the friction plates 91 to 96 is set to such a magnitude that each of the friction plates 91 to 96 is able to generate an appropriate friction force that allows relative rotation between the corresponding adjacent two of the plate elements 71 to 75.

Figure 9:
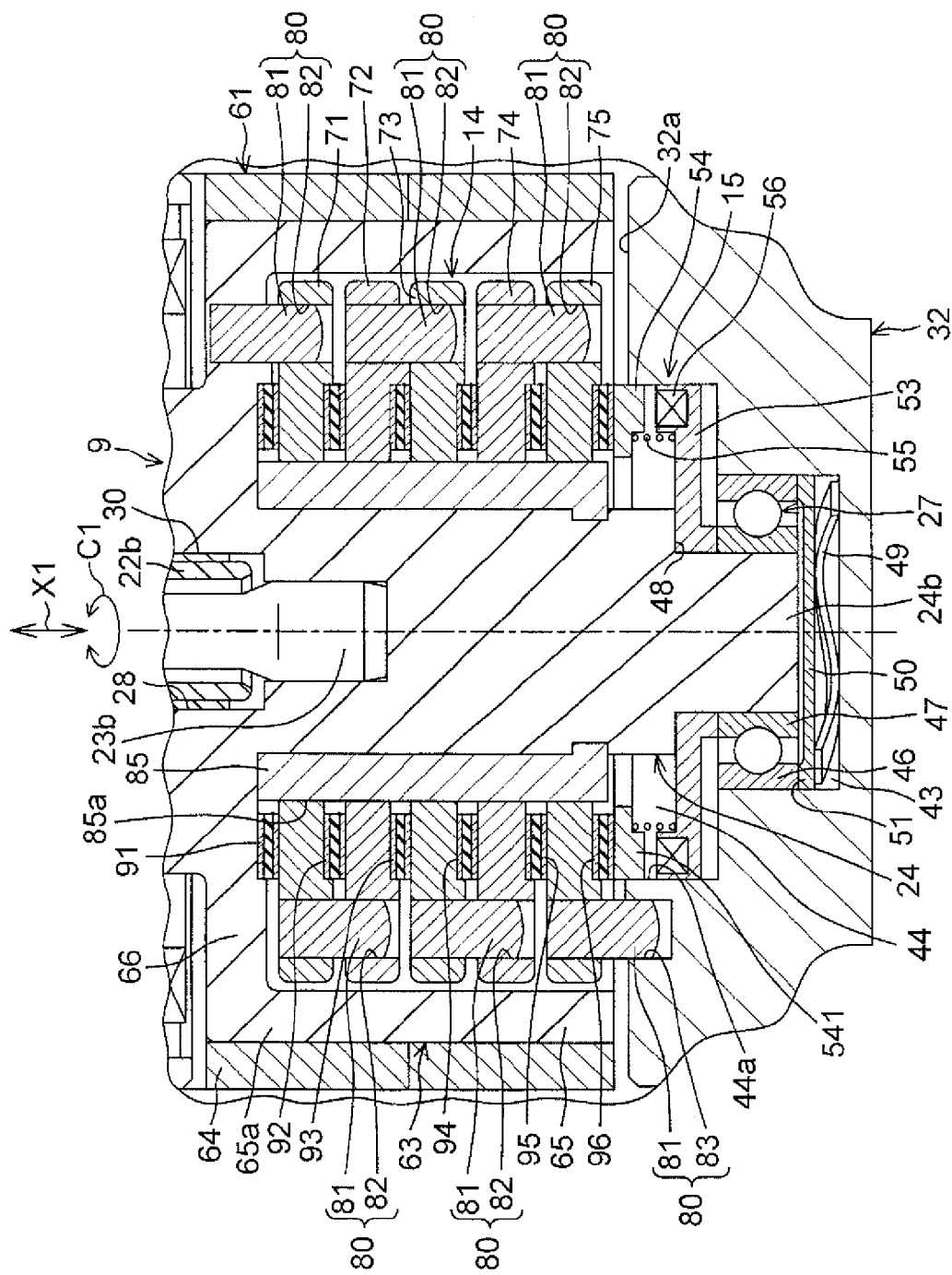
FIG. 9 is a sectional view of the rotation angle restriction mechanism and its surroundings at the time of a failure.

At the time of a failure as shown in FIG. 9, because the electromagnetic clutch 15 is turned off, the urging member 55 separates the pressing member 54 from the electromagnet 56, and firmly presses the plate element 75 via the pressing member 54 and the friction plate 96. Thus, the elastic plates 98 of the respective friction plates 91 to 96 are elastically compressed, and all the plate elements 71 to 75 are assembled to the second portion 66 (rotatable element) of the motor rotor 61. That is, at the time of a failure, when the steering member 2 is steered, all the plate elements 71 to 75 and the second portion 66 (rotatable element) rotate together with each other, and the protrusion 81 formed on the plate element 75 contacts one of the restricting portions 83a, 83b that are the terminal ends of the engagement groove 83 of the end wall 32 (non-rotatable element), as shown in FIG. 6B.

The steering direction detection sensors 16 are formed of a pair of contact sensors 16a, 16b that are respectively provided at the restricting portions 83a, 83b. That is, when the contact sensor 16a detects the fact that the protrusion 81 of the plate element 75 contacts the restricting portion 83a, the ECU 19 detects steering to the left. On the other hand, when the contact sensor 16b detects the fact that the protrusion 81 of the plate element 75 contacts the restricting portion 83b, the ECU 19 detects steering to the right.

Figure 8:
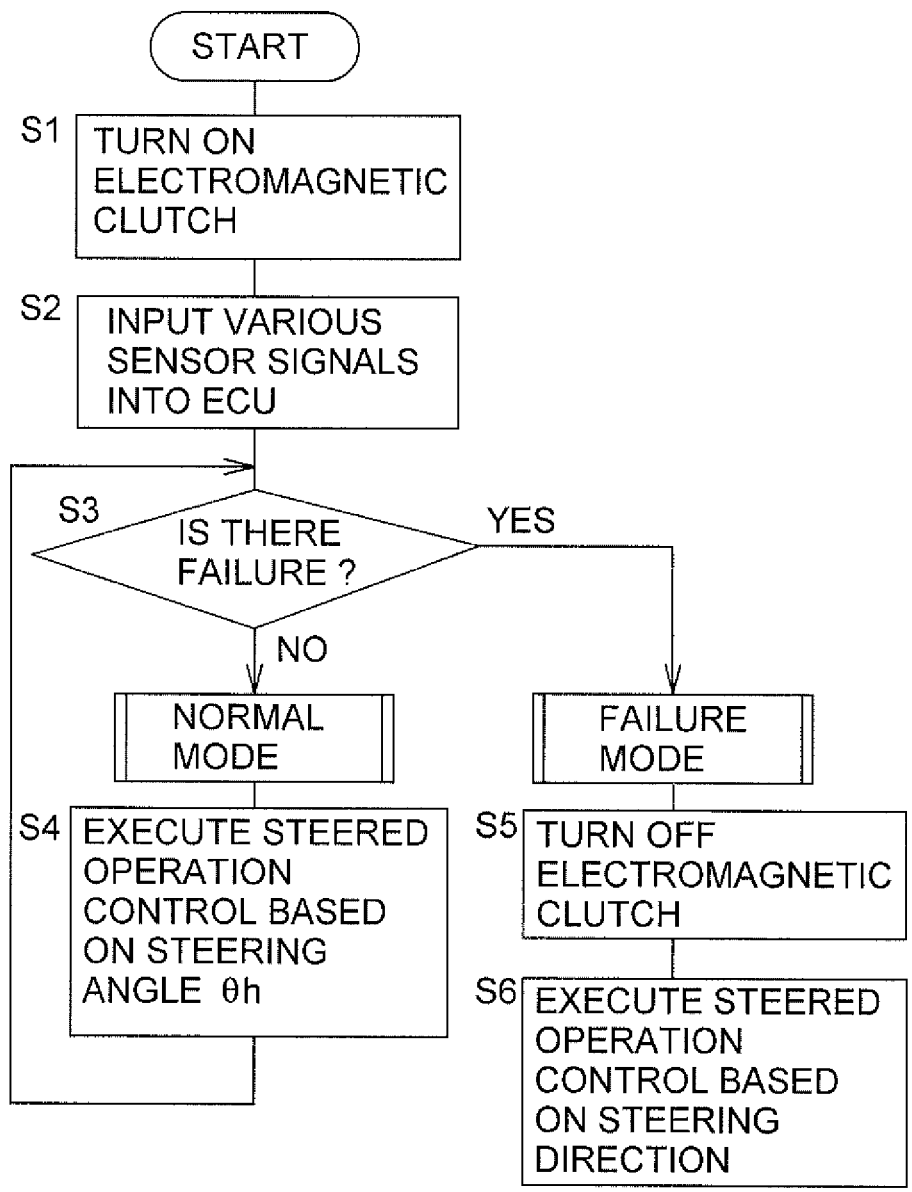
FIG. 8 is a flowchart that shows the flow of steered operation control.

Next, FIG. 8 shows the flow of main control of the ECU 19. When the system starts up, first, in step S1, the electromagnet 56 of the electromagnetic clutch 15 (switching mechanism) is excited, and the restricted angle by the rotation angle restriction mechanism 14 is set to the first rotation angular range δmax. Subsequently, in step S2, signals from the various sensors are input in the ECU 19, and, in step S3, it is determined whether there is a failure (malfunction of the steering angle sensor 12) on the basis of the signal from the steering angle sensor 12.

When there is no failure (NO in step S3), the process shifts into a normal mode. In the normal mode, the steering system actuator 4 is subjected to drive control (steered operation control) on the basis of the steering angle θh detected by the steering angle sensor 12. When there is a failure (YES in step S3), the process shifts into a failure mode. In the failure mode, in step S5, the electromagnet 56 of the electromagnetic clutch 15 (switching mechanism) is de-excited, and the restricted angle by the rotation angle restriction mechanism 14 is set to the second rotation angular range δ2. Subsequently, in step S6, on the basis of the steering direction detected by one of the contact sensors 16a, 16b of the steering direction detection sensors 16, the steering system actuator 4 is subjected to drive control (steered operation control) such that the steering system actuator 4 is driven in the corresponding steered direction while the one of the contact sensors 16a, 16b is on.

According to the present embodiment, in the event of a failure, that is, when there is a malfunction in the steering angle sensor 12, the rotation angle restriction mechanism 14 is switched into the second state. The steering direction detection sensors 16 detect the steering direction on the basis of at which one of the terminal ends of the restricted angular range (corresponding to the second rotation angular range δ2) of the steering member 2 in the second state, the steering member 2 is located. When the ECU 19 executes drive control on the steering system actuator 4 on the basis of the detected steering direction, it is possible to perform steering, thereby achieving fail safe.

The steering direction detection sensors 16 just need to detect at which one of the terminal ends of the second rotation angular range δ2, the steering member 2 is located. Therefore, inexpensive on/off sensors or switches, such as the contact sensors 16a, 16b, may be used as the steering direction detection sensors 16. As a result, it is possible to reduce manufacturing cost. Furthermore, in the event of a failure, the steering member 2 does not need to be operated at such a large steering angle larger than or equal to 360° (which corresponds to the first rotation angular range δmax), and steering is switched to steering to the left or steering to the right only by operating the steering member 2 at a relatively small rotation angle (within the second rotation angular range δ2). Therefore, good operability is achieved.

In normal times, by restricting the amount of relative rotation between adjacent elements among the non-rotatable element (end wall 32), the plate elements 71 to 75 and the rotatable element (second portion 66 of the rotor core 63), the rotation angle of the steering member 2 is restricted within the first rotation angular range δmax. In the event of a failure, when the rotatable element (second portion 66) and the plate elements 71 to 75 are assembled together with the use of the switching mechanism (electromagnetic clutch 15), the plate element 75 adjacent to the non-rotatable element (end wall 32) rotates within the second rotation angular range δ2 on the basis of the rotation direction of the steering member 2, and the protrusion 81 engages with a corresponding one of the restricting portions 83a, 83b. It is possible to easily detect the steering direction on the basis of this engagement.

When the electromagnetic clutch 15 is turned off, the pressing member 54 urged by the urging member 55 urges the plate elements 71 to 75 toward the rotatable element (second portion 66). Thus, it is possible to easily assemble the plate elements 71 to 75 and the rotatable element (second portion 66) together. As a result, it is possible to switch the rotation angle restriction mechanism 14 into the second state.

The non-rotatable element (end wall 32) and the rotatable element (second portion 66) are arranged on respective sides of the plate elements 71 to 75, which are coaxially supported by the rotary shaft (output shaft 24) of the steering member 2, in the axial direction X1. Therefore, it is possible to arrange the elements of the rotation angle restriction mechanism 14 in a compact space, and it is possible to achieve a reduction in size.

In addition, by accommodating the reaction motor 10 that applies steering reaction force to the steering member 2 and the rotation angle restriction mechanism 14 in the same housing 11, it is possible to achieve simplification of the structure and a reduction in size in the steer-by-wire vehicle steering system 1.

The invention is not limited to the above-described embodiment. For example, in the above-described embodiment, the protrusion 81 is provided on the plate element 75, and the engagement groove 83 is formed in the end wall 32 (non-rotatable element). Alternatively, a protrusion provided on the end wall 32 (non-rotatable element) may be engaged with an engagement groove formed in the plate element 74.

In the above-described embodiment, the inner peripheries of the plate elements 71 to 75 are supported by the outer periphery of the tubular member 85 fitted to the outer periphery of the steering shaft 9 (output shaft 24). Alternatively, the inner peripheries of the plate elements 71 to 75 may be directly supported by the steering shaft 9 (output shaft 24) (the structure is not shown).

The plate elements 71 to 75 may be retained by a plain bearing (not shown) retained on the inner periphery of the first portion 65 of the motor rotor 61. Other than the above, various modifications may be made within the scope of the appended claims.

What is claimed is:

1. A vehicle steering system in which a steering member that is allowed to be rotated 360 degrees or more and a steered wheel are not mechanically coupled to each other, comprising:
    a steering angle sensor that detects a steering angle of the steering member;
    a steering system actuator that drives the steered wheel;
    a rotation angle restriction mechanism that is switchable between a first state in which a rotation angle of the steering member is restricted within a first rotation angular range that is larger than or equal to 360 degrees and a second state in which the rotation angle of the steering member is restricted within a second rotation angular range that is smaller than 360 degrees;
    a switching mechanism that selectively switches the rotation angle restriction mechanism into the first state or the second state;
    a steering direction detection unit that, when the rotation angle restriction mechanism is in the second state, detects a steering direction of the steering member on the basis of at which one of a pair of terminal ends of the second rotation angular range, the steering member is located; and
    a control unit that has a normal mode in which drive control is executed on the steering system actuator on the basis of the steering angle detected by the steering angle sensor and a failure mode in which, when there is a malfunction in the steering angle sensor, drive control is executed on the steering system actuator on the basis of the steering direction detected by the steering direction detection unit in a state where the rotation angle restriction mechanism is switched into the second state by the switching mechanism.

2. The vehicle steering system according to claim 1, wherein
    the rotation angle restriction mechanism includes: a rotatable element that is coaxially rotatable together with a rotary shaft of the steering member; a non-rotatable element that faces the rotatable element in an axial direction of the rotary shaft; a plurality of annular plate elements that are interposed between the rotatable element and the non-rotatable element, that are coaxially supported by the rotary shaft and that are rotatable with respect to the rotary shaft; and coupling elements, each of which couples adjacent elements among the non-rotatable element, the plurality of plate elements and the rotatable element so as to restrict an amount of relative rotation between the adjacent elements,
    each of the coupling elements includes a protrusion formed on one of the adjacent elements and a pair of restricting portions that are formed at the other one of the adjacent elements and that selectively engage with the protrusion based on the steering direction,
    the switching mechanism switches the rotation angle restriction mechanism into the second state by pressing the plurality of plate elements toward the rotatable element such that the plurality of plate elements are rotated together with the rotatable element, and
    when the rotation angle restriction mechanism is switched into the second state, the steering direction detection unit detects the steering direction on the basis of with which one of the pair of restricting portions formed at the other one of the non-rotatable element and the plate element adjacent to the non-rotatable element, the protrusion formed at the one of the non-rotatable element and the plate element adjacent to the non-rotatable element engages.

3. The vehicle steering system according to claim 2, wherein the steering direction detection unit includes contact sensors, each of which detects a contact of the protrusion with a corresponding one of the restricting portions.

4. The vehicle steering system according to claim 2, wherein
    the switching mechanism includes an electromagnetic clutch, and
    the electromagnetic clutch includes: a clutch rotor that rotates together with the rotary shaft and that is not movable in the axial direction of the rotary shaft; a pressing member that moves in the axial direction of the rotary shaft to press the plate element adjacent to the non-rotatable element toward the rotatable element; an urging member that is interposed between the clutch rotor and the pressing member and that urges the pressing member toward the rotatable element; and an electromagnet that attracts the pressing member and the clutch rotor against the urging member.

* * * * *